No. 829,594. PATENTED AUG. 28, 1906.
H. F. MASSEY.
DROP HAMMER OR STAMP.
APPLICATION FILED FEB. 12, 1903.

Witnesses:
Henry Thieme
George Barry Jr.

Inventor:
Harold F. Massey
by attorneys
Brown & Seward

No. 829,594.  PATENTED AUG. 28, 1906.
H. F. MASSEY.
DROP HAMMER OR STAMP.
APPLICATION FILED FEB. 12, 1903.

UNITED STATES PATENT OFFICE.

HAROLD F. MASSEY, OF WITHINGTON, ENGLAND.

DROP HAMMER OR STAMP.

No. 829,594.  Specification of Letters Patent.  Patented Aug. 28, 1906.

Application filed February 12, 1903. Serial No. 143,125.

*To all whom it may concern:*

Be it known that I, HAROLD FLETCHER MASSEY, engineer, a subject of the King of the United Kingdom of Great Britain and Ireland, and a resident of 1 Gordon Place, Withington, in the county of Lancaster, England, have invented certain new and useful Improvements in Drop Hammers or Stamps, of which the following is a specification.

This invention consists in improvements in pulling mechanism and holding devices for use in or in connection with drop stamps or hammers or other machines or devices, and relates to apparatus in which a constantly-revolving part, such as a drum or pulley or other equivalent part, is employed and another part is alternately brought into frictional connection therewith and released therefrom at the will of the operator, and thus caused to lift and release or pull and release some other part, such as the tup of a hammer, in connection with which it is used.

The object of this invention is to simplify and improve the construction and arrangement of mechanism of the said kind and so to render such mechanism more efficient in action and more convenient and easy to control than it has hitherto been, especially by contriving that a part, such as a cord or chain or lever, moved by the operator being moved through a short distance in one direction or the other shall cause movements exactly corresponding, but of range greater in any desired proportion than those given to it, to be imparted to the part to be moved or being held stationary in any position shall cause the part moved thereby when in action to be held stationary in a corresponding position, and, further, by so contriving to make possible the use of treadles as means of controlling the movement and use of parts moved in the said way and also in any cases in which it may be desirable to make possible the use of automatic means for bringing about alternating movements of the parts moved.

In the accompanying drawings.

The mechanism provided according to this invention consists, essentially, in a part, such as a drum or pulley, which is constantly revolving in one direction while at work and a part which being capable of revolution to a greater or less extent may be brought by means of a friction-clutch into frictional connection with the constantly-revolving part by force being exerted upon a suitable clutch-engaging device in rolling engagement with a part made to turn with the part which may be brought into frictional connection with the constantly-revolving part and is so contrived that when the said parts are put into frictional connection such device will be moved in the same direction as by the force applied to it in order to bring the said parts into frictional connection and by being so moved allow a releasing device, such as a spring, to disengage more or less from the constantly-revolving part the part moved thereby. The effect of this contrivance is that the movement of the part put into frictional connection with the constantly-revolving part by the device to which force is applied, as aforesaid, relieves such device of the force applied to it unless it be moved further in the same direction, and consequently the partial or complete release or stoppage of the said device reduces or interrupts the frictional connection between the constantly-revolving part and the other part aforesaid, and thus the said device being operated in any manner brings about an exactly corresponding behavior of the device—as, for instance, a hammer-tup connected to the part moved by the constantly-revolving part, as aforesaid.

Figures 1, 3, 4, 5, 6:
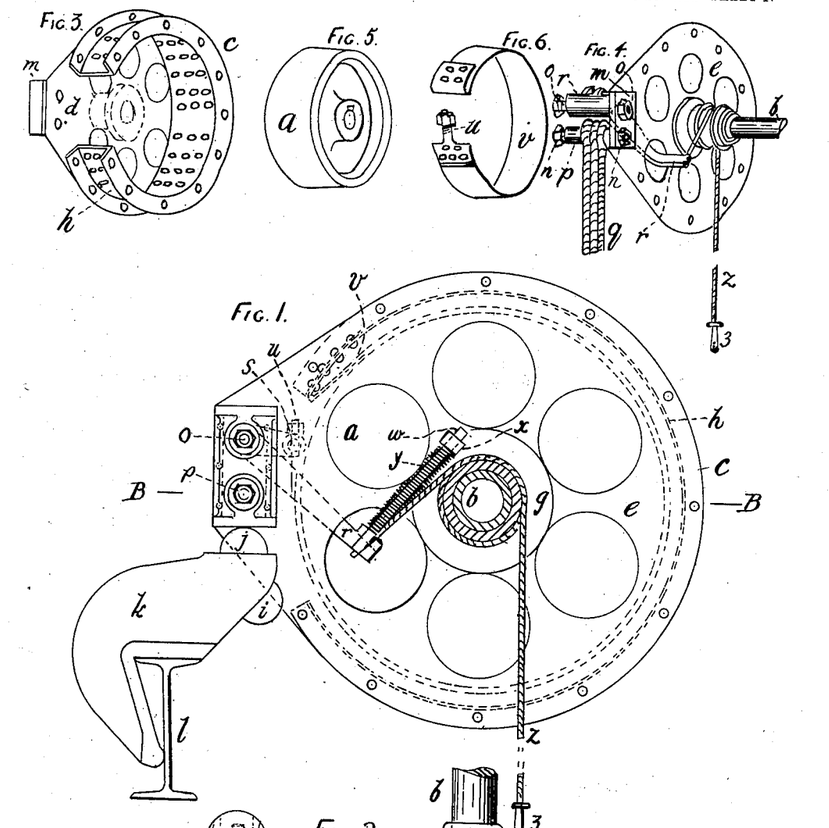
Figure 1 is a side elevation, partly in vertical section, on the plane indicated by the line A A of Fig. 2 and illustrating one form of lifting or pulling apparatus provided according to this invention.
Fig. 3 is an oblique elevation of a part of a drum used in the said apparatus.
Fig. 4 is an oblique elevation of the other part of the said drum and parts carried by it and parts used with it.
Fig. 5 is an oblique elevation of a pulley used with the said drum.
Fig. 6 is an oblique elevation of a metal band or strap used with the said pulley.
Figure 2:
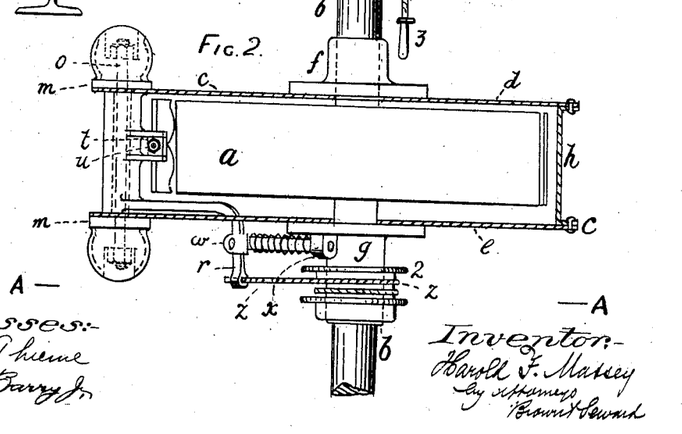
Fig. 2 is a plan, in part a horizontal section, taken on the plane indicated by the line B B of Fig. 1.

In the apparatus illustrated in Figs. 1, 2, 3, 4, 5, and 6 the constantly-revolving part is a pulley $a$, fast upon a shaft $b$, made to revolve constantly by any suitable means, and the part to which such constantly-revolving part or pulley $a$ is made to impart motion when in action is a drum $c$, which, as shown, is formed of steel plates $d$ $e$, secured to bosses $f$ $g$ and connected together by a rim $h$. The plates $d$ $e$, forming the sides of the drum $c$, and the rim $h$ are perforated in order that air may pass freely to the pulley $a$. The drum $c$ is free to oscillate upon the shaft $b$ through about three-fourths of a revolution, its movement being limited in each direction by buffers $i$ $j$, carried on a bracket $k$, secured on a cross-girder $l$, corresponding to that to be hereinafter mentioned in reference to Figs. 14 and 15. The drum $c$ is provided with strengthening-plates $m$, one at each side, to strike against the buffers $i$ $j$ and also to carry two stays or cross-bars $n$ $o$, which are provided with screw-threads to receive nuts to hold them in position in the drum $c$. The one cross-bar or stay $n$ is furnished with a sleeve $p$, around which, as is shown in Fig. 4, a connection $q$, such as a rope, may be secured in order to move the object, such as the hammer-tup, to be moved by means of the pulley $a$. The other stay or cross-bar $o$ carries a lever $r$, capable of being oscillated upon it. The lever $r$ is furnished with one long arm made to extend out through one of the holes in the plate $e$ and with two short arms, the two short arms carrying a stud $s$, passed through a block $t$, with a hole to receive a screwed stud $u$, secured at one end of a flexible metal band $v$, like a brake-band, which being made to partially surround the pulley $a$ is secured at its other end to the rim $h$. The stud $u$ is furnished with a nut securing it in the block $t$.

Figure 14:
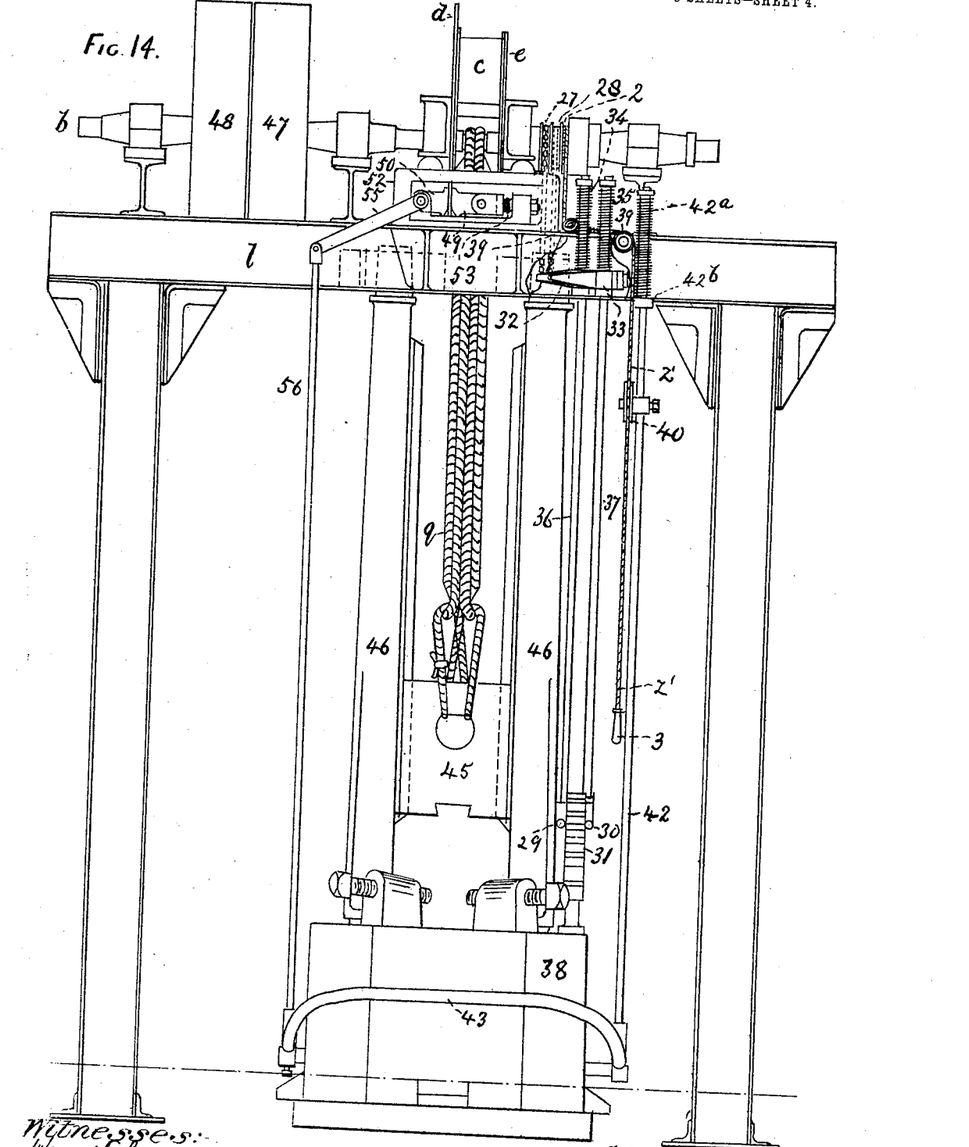
Fig. 14 is a front elevation of a form of apparatus—namely, a drop-stamp—provided according to this invention and illustrating another way of contriving the automatic action of such an apparatus and also one way of combining with automatic devices means to enable either a treadle or a handle to be used at any time, as may be desirable in order to control the action of the part to be lifted or pulled and held stationary or released.
Figure 15:
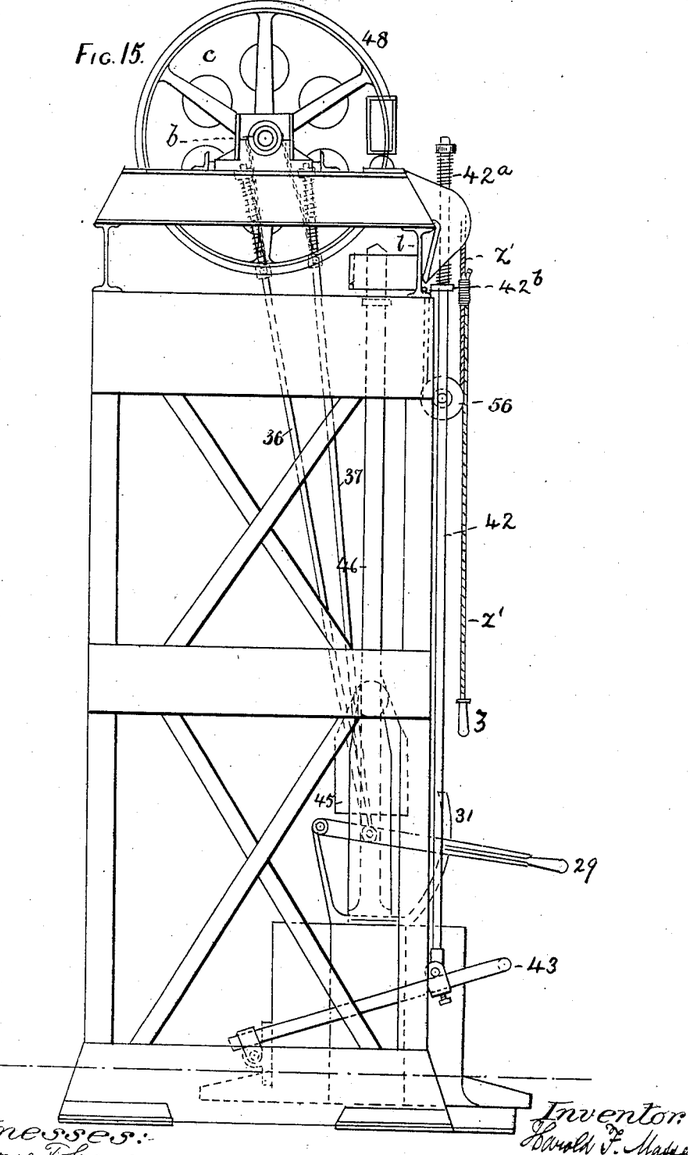
Fig. 15 is a side elevation of the apparatus illustrated in Fig. 14.

The long arm of the lever $r$ receives one end of a rod $w$, having a shoulder to bear against the said arm and made to pass freely through a hole in a stud $x$, secured in the boss $g$, and a spring $y$, surrounding the rod $w$, bears against the shoulder of the rod $w$ and against the stud $x$. A flexible connection (shown as a cord $z$) is connected to the lever $r$ and being led in the direction of the revolution of the shaft $b$ around the groove of a grooved pulley 2, capable of being revolved upon the boss $g$, is provided at its free end with a handle 3. The cord $z$ is thus in rolling connection with the grooved pulley 2, mounted about the axis of the friction-clutch constituted by the drum $c$, band $v$, and pulley $a$. When the pulley 2 is revolving, if the cord $z$ be pulled, as by means of the handle 3, the lever $r$, being turned against the pressure of the spring $y$, will cause the band $v$ to tighten upon the pulley $a$ and by so doing cause the pulley $a$ to revolve the drum $c$, so that the tup or other object connected to such drum $c$ by means of the connection $q$ will be lifted or moved in the manner requisite. As the drum $c$ is turned the cord $z$, being unwound from the pulley 2, is slackened. So in order that the spring $y$ may not disengage the band $v$ from the pulley $a$ the cord $z$ must be further pulled, so long as the object connected to the connection $q$ is to be moved thereby. If the cord $z$ be released, the spring $y$ at once disengages the band $v$ from the pulley $a$, and the object connected to the connection $q$ is allowed to return to the position from which it was moved thereby. If the cord $z$ be pulled to a certain point and then held stationary, the friction of the band $v$ upon the pulley $a$ is at once reduced until it is just sufficient to prevent the object connected to the connection $q$ from returning to the position from which it was moved thereby, for if the drum $c$ were to pull the connection $q$ any farther the cord $z$ would become quite slack, while, on the other hand, if the drum $c$ were to be moved backward by the connection $q$ even to the slightest extent the cord $z$ would be tightened and the band $v$ would be made to grip the pulley $a$. The object connected to the connection $q$ is thus under perfect control and follows accurately the movements imparted to the cord $z$, but on a much larger scale, depending upon the ratio between the radii of the drum $c$ and pulley 2 and the drum $c$ moving in one direction or the other quickly or slowly as a corresponding movement is given to the cord $z$ or remaining stationary in any position when the cord $z$ is held stationary in a corresponding position. Thus the control of the stamp in which the apparatus illustrated in Figs. 1, 2, 3, 4, 5, and 6 is employed as the means of lifting the tup is exactly similar to that of the old fashioned "kick-stamp" or "pull-stamp," but with two very important differences—namely, that the pull required upon the cord $z$ is only a mere fraction of the pull required in the old stamps and that the movement to be given to the cord $z$ is very short, being only a few inches instead of the full length of the stroke of the stamp. This last-named advantage enables a foot-lever to be used instead of or in addition to a handle 3 when it may be preferred, as is illustrated in Figs. 14 and 15, to be hereinafter further referred to.

Figure 7:
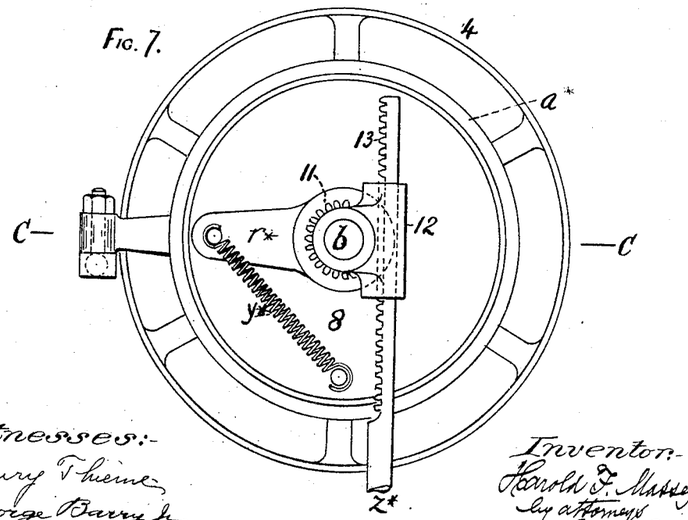
Fig. 7 is a side elevation of another form of lifting or pulling apparatus provided according to this invention.
Figure 8:
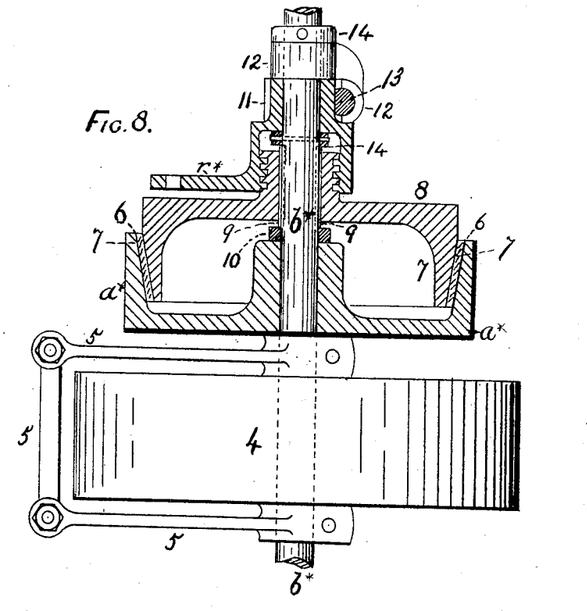
Fig. 8 is in part a plan and in part a horizontal section taken on the plane indicated by the line C C of Fig. 7.

In the apparatus illustrated in Figs. 7 and 8 the constantly-revolving part is a pulley $a^*$, loose upon a shaft $b^*$. Loose on this shaft $b^*$ is mounted a second pulley 4 within a frame 5, formed of arms secured to the shaft $b^*$. To the frame 5 the object to be pulled or lifted may be connected in any suitable way, as by a strap or rope, which is connected to the cross-bar of the frame 5 and being pulled by means of such frame 5 will bear upon the pulley 4, the pulley 4 serving to support the said strap or rope without applying friction thereto and without interference by its inertia with the action of such strap or rope.

The pulley $a^*$ is formed internally with one part 6 of a friction-clutch 7, the other part 8 of which, in the form of a truncated cone covered with friction material, such as leather, is capable of being slid lengthwise of the shaft $b^*$ and engaging with keys 9, secured therein, a loose collar 10 being interposed between the part 8 and the boss of the pulley $a^*$. Upon the boss of the part 8 of the friction-clutch 7 are formed screw-threads, preferably in the form of a double-threaded screw of moderate pitch engaging into corresponding screw-threads formed in the boss of a lever $r^*$, capable of being oscillated upon the shaft $b^*$ and formed with a pinion 11. The spring $y^*$, secured at one end to the part 8 of the friction-clutch 7 and at the other end to the lever $r^*$, serves to hold the lever $r^*$ in one position when at rest and return it thereto after displacement.

Loose upon the shaft $b^*$ is mounted a guide 12, through which passes, so as to be guided therein, a rack 13, engaging with the pinion 11, and so in rolling connection with a part mounted about the axis of the friction-clutch. The rack 13 is formed upon a rod $z^*$, corresponding in function to the cord $z$. (Shown in Figs. 1 and 4.) Collars 14, secured to the shaft $b^*$, prevent the lever $r^*$ and guide 12 from being moved lengthwise thereof. If while the pulley $a^*$ is revolving the rack 13 be moved to turn the lever $r^*$ in opposition to the tension of the spring $y^*$, the screw-threads in the boss of the lever $r^*$ press the part 8 of the friction-clutch 7 into engagement with the part 6, formed within the pulley $a^*$, so that the part 8, the shaft $b^*$, and the frame 5 are turned also, and unless the rack 13 be moved farther in the same direction the turning of the part 8 of the friction-clutch 7 will screw it out of engagement with the part 6 in the pulley $a^*$, and thus the action of the apparatus illustrated in Figs. 7 and 8 corresponds with that of the apparatus illustrated in Figs. 1, 2, 3, 4, 5, and 6.

Figures 9, 10, 11, 12, 13:
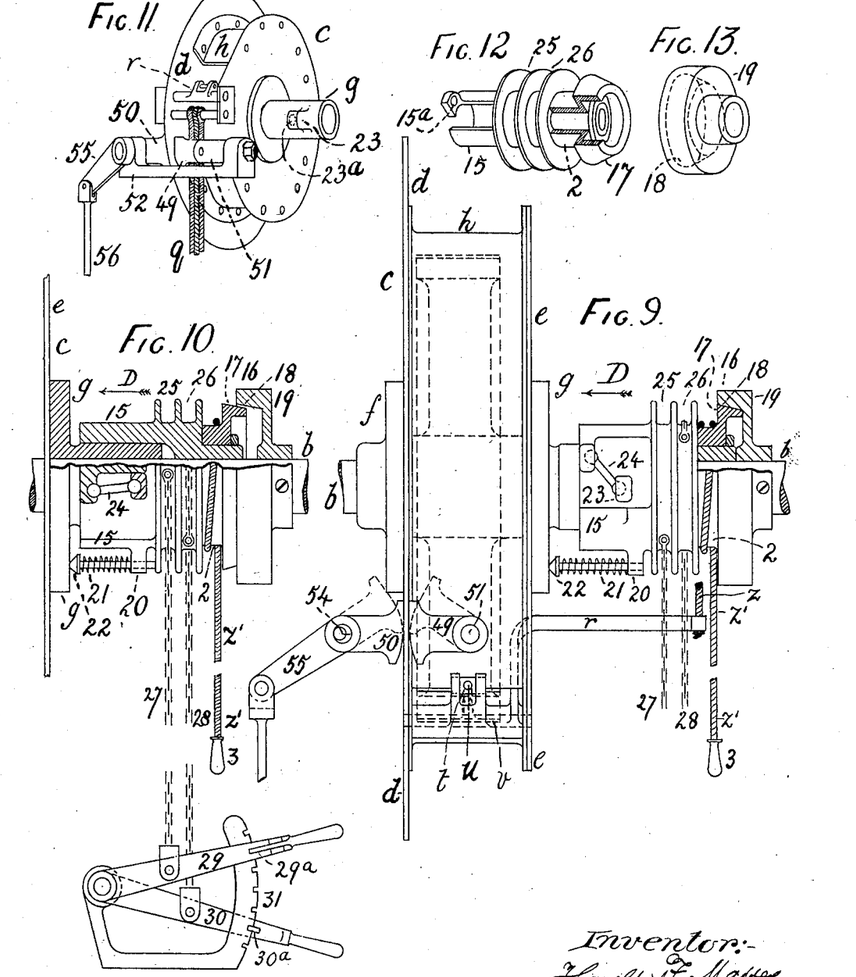
Fig. 9 is a front elevation, in part a vertical section, taken through the axis of the shaft thereof of another form of apparatus provided according to this invention and illustrating one way of providing for automatic action and showing some of the parts in one of the positions which they occupy.
Fig. 10 is a vertical section, in part a side elevation, of a part of the apparatus shown in Fig. 9 and showing some of the parts in a position different from that in which they are shown in Fig. 9 and showing some parts not shown in Fig. 9.
Fig. 11 is an oblique elevation showing the drum and certain other parts of the apparatus shown in Figs. 9 and 10.
Fig. 12 is an oblique elevation showing part broken away and showing one part of a friction-clutch used in the apparatus illustrated in Figs. 9 and 10.
Fig. 13 is a perspective view showing another part of the said friction-clutch.

In order that an apparatus provided according to this invention may be made automatic so far as concerns the alternate engagement and disengagement of the friction driving mechanism, it is only necessary to provide means for moving or tightening and returning or releasing the device in rolling connection with a part mounted about the axis of the friction-clutch and enabling force to be applied to bring the friction driving mechanism into action. This may be done by means of any suitable means—such, for instance, as tappets, or, as shown in Figs. 9, 10, 11, 12, and 13, which show an apparatus substantially similar to that illustrated in Figs. 1, 2, 3, 4, 5, and 6, but provided with devices to automatically engage and disengage the friction driving mechanism. In Figs. 9 and 10 part of the mechanism forming the automatic devices is represented somewhat diagrammatically, being represented in complete form in Figs. 14 and 15, which show the form of apparatus illustrated by Figs. 9, 10, 11, 12, and 13 applied to a drop-stamp.

In the apparatus illustrated in Figs. 9, 10, 11, 12, 13, 14, and 15 the cord $z$, connected to the lever $r$, not only passes around the pulley 2, with which it is in rolling connection, but is fastened to it so that if the pulley 2 be turned in one direction the cord $z$ will be pulled so as to bring the band $v$ into engagement with the pulley $a$, while by the holding stationary or the release and consequent return of the pulley 2 the band $v$ may be allowed to slip upon or release the pulley $a$, so that the drum $c$ may be held stationary or returned to its position of rest. The pulley 2 in the apparatus illustrated in Figs. 9, 10, 11, 12, and 13 is mounted so as to be capable of turning but not of moving laterally upon a sleeve 15, which is mounted partly upon the boss $g$ of the drum $c$ and partly upon the shaft $b$, carrying the drum $c$ and the pulley $a$ of the principal friction-clutch employed in this case. The sleeve 15 is made capable of moving lengthwise for a little distance and also capable of being turned about the boss $g$ between the two positions in which it is indicated in Fig. 9 and Fig. 10.

A friction-clutch 16 is provided to turn the pulley 2. One part, 17, of the friction-clutch 16 is formed upon the pulley 2, and the other part, 18, is formed within a drum 19, fixed rigidly to the shaft $b$. A projection 20 is formed on the sleeve 15. A spring 21 is made to bear at one end against the projection 20 and at the other end against the head of a rod 22, capable of being slid in a hole formed in the projection 20, and the rod 22 is made to bear against the boss $g$ and tends to press the parts 17 18 of the friction-clutch 16 together. The boss $g$ is also provided with a projection 23, which is made to project through a slot in the sleeve 15. The projection 23 is formed with a hollow $23^a$, and a part of the sleeve 15 at one end of the slot therein is formed with a corresponding hollow $15^a$, and a strut 24 is made to enter at its ends into the hollows $23^a$ and $15^a$. In the position in which the strut 24 is indicated in Fig. 10 it holds the parts 17 18 of the clutch-box 16 apart against the pressure of the spring 21, the projection 23 being in such position relatively to the hollow $15^a$ that the pressure of the spring 21 holds the projection 23 against one side of the slot in the sleeve 15. In the position in which the strut 24 is indicated in Fig. 9 it affords no resistance to the spring 21. The sleeve 15 is provided with two grooves 25 26, and two chains 27 28, each fixed at one end to the sleeve 15, are coiled one in each of the grooves 25 26 around the sleeve 15 in opposite directions and at their other ends are respectively connected to levers 29 30, capable of being readily fixed in different positions by means of a sector 31 and catches $29^a$ $30^a$, the chains 27 28 being thus in rolling connection with the sleeve 15. The connection between the chains 27 28 and the levers 29 30 is indicated diagrammatically in Fig. 10, but in Fig. 14 it is shown that the chains 27 28 are respectively connected to brackets 32 33, capable of being slid against the pressure of springs 34 35 on rods 36 37, connected to the levers 29 30, respectively, the springs 34 35 yielding somewhat when the chains 27 28 are tightened, so preserving the chains 27 28 from strain and breakage. The quadrant 31 is secured at one side of the block 38, provided to receive the anvil or lower die of the drop-stamp. In the position in which the parts are shown in Fig. 9 the part 17 of the friction-clutch 16 being in engagement with the part 18 thereof the pulley 2 is caused to rotate with the shaft $b$ and pull the cord $z$ and by means of the lever $r$ bring and hold the band $v$ in engagement with the pulley $a$, and so cause the drum $c$ to be turned with the shaft $b$. The sleeve 15 being turned with the drum $c$ by means of friction against the pulley 2, the boss $g$ and shaft $b$ causes the chain 27 to become tight after the drum $c$ has been turned through a certain distance, and then the turning of the sleeve 15 being checked the momentary further turning of the drum $c$, moving the projection 23 relatively to the sleeve 15, causes the strut 24 to thrust the sleeve 15 in the direction indicated by the arrow D, so as to disengage the part 17 of the friction-clutch 16 from the part 18 thereof, so that the pulley 2 is set free from the shaft $b$ and the spring $y$ is permitted to disengage the band $v$ from the pulley $a$ and allow the drum $c$ to be returned to its initial position. As the drum $c$ is moved back to its initial position the chain 27 is unwound from the sleeve 15 and the chain 28 is wound thereon, and having been adjusted so as to become tight at a suitable time the tightening of the chain 28, in due course arresting the sleeve 15, permits the drum $c$ in its momentary continued motion to move the strut 24 into the position in which it is shown in Fig. 9, so that the part 17 of the friction-clutch 16 being brought again into connection with the shaft $b$ the cord $z$ is again pulled to bring the band $v$ into engagement with the pulley $a$. The band $v$ is thus engaged with and disengaged from the pulley $a$ automatically and in a very simple manner and the levers 29 30 being readily adjusted into and secured in different positions, as may be desirable from time to time, it is very easy to arrange for the parts moved by means of the pulley $a$ and drum $c$ to be moved to and fro between any desired points. A cord $z'$ is also shown as connected at one end to the pulley 2, so that it may be coiled on and uncoiled therefrom, so that being pulled and released it may be used to cause the cord $z$ to pull the band $v$ into engagement with and allow it to release the pulley $a$ exactly like the cord $z$, (shown in Figs. 1 and 4,) and so when the levers 29 30 have been secured in a position such that neither chain 27 28 becomes tight in the turning to and fro of the drum $c$ the apparatus illustrated in Figs. 9, 10, 11, 12, and 13 can be controlled by the operator instead of automatically whenever this may be desirable. The cord $z'$ may be simply provided with a handle 3, as illustrated in Figs. 9 and 10, or may be connected to handle 3 and also arranged to be operated by means of a treadle, as is illustrated in Fig. 14, in which the cord $z'$ is formed in two parts connected together, one of the parts being led over pulleys 39, provided to guide it, and also to a fixed point after being led around a pulley 40, secured to a rod 42, connected to a treadle 43, by means of which the pulley 40 can be moved, and the other part of the said cord, which is connected above the pulley 40, is provided with a handle 3, so that it may be pulled by hand. The pulley 10, which is adjustable upon the rod 42, serves when put in suitable position to pull the cord $z'$, and so to turn the pulley 2, and so to pull the cord $z$ when the treadle 43 is depressed, any movement of the pulley 40 then causing twice as much movement of the cord $z'$ and the cord $z$. The stamp illustrated in Figs. 14 and 15 is thus controllable by hand, by foot, or automatically, as may be desirable from time to time. A spring $42^a$ is provided between a collar on the rod 42 and a guide $42^b$ on the girder $l$ to raise the treadle 43 to its normal position after it has been depressed. In Figs. 14 and 15 the drum $c$ is illustrated as connected by means of a flexible connection $q$, formed of rope, to the tup 45 of the stamp. The tup 45 may be guided in any suitable manner, and, as shown, is guided by upright guides 46, secured to the anvil-support 38 and the cross-girder $l$ of the framework, which carries the shaft $b$ and the fast and loose pulleys 47 48 and other parts mounted thereon.

In the application to a drop-stamp of the apparatus provided with an automatic engaging and disengaging device it is very desirable and generally necessary to provide means by which the tup 45 of the drop-stamp can be held up away from the anvil, and therefore there are provided dogs or brake-blocks 49 50 to act in conjunction with the plate $d$ of the drum $c$, which in this case is made of larger diameter than the plate $e$ for the dogs 49 50 to act against it. The dog 49 is pivoted upon a stud 51, secured by a nut in a bracket 52, secured, but capable of being slid to and fro lengthwise of the cross-girder $l$, being furnished with a tongue to enter a groove in the said girder $l$. Between the bracket 52 and the part of the stud 51 which carries the pivot of the dog 49 is placed a spring 53 in compression. The other brake-block 50 is pivoted upon an eccentric 54, to the axle of which is secured an arm 55, connected by a rod 56 to the treadle 43, so that when the treadle 43 is depressed the arm 55 being also depressed will by means of the eccentric 54 move the dog 50 away from the plate $d$ and allow the drum $c$ to be turned by the tup 45.

When the hereinbefore-described mechanism for effecting the automatic engagement and disengagement of the band $v$ with and from the pulley $a$ has been adjusted in the manner requisite and the tup 45 has been once raised in the manner hereinbefore described by the action of the friction-clutch 16 or otherwise, the dogs 49 50 will engage with the drum $c$ and prevent it from being turned backward by the tup 45 when the band $v$ is made to release the pulley $a$ until by the treadle 43 being depressed the dog 50 is moved out of contact with the plate $d$, whereupon the tup 45 is at once allowed to fall. When the tup 45 has fallen, it is again raised, and unless the treadle 43 be again depressed or be kept depressed the tup 45 will be held up again, while if the treadle 43 be kept depressed the tup 45 will continue alternately to be raised and allowed to drop. The lever 29 enables the height to which the tup 45 is lifted to be adjusted easily and quickly, and the lever 30 enables the mechanism to be set with ease for the tup 45 to be lifted from the position into which it rebounds after a blow has been struck whatever the thickness of the die or other articles put beneath it may be. The spring 53 reduces the shock to which the dogs 49 50 and the framework and especially the connection $q$ are subject when the dogs 49 50 grip the plate $d$, and also affords a ready means of accurately adjusting the intensity of the grip of the dogs 49 50 upon the plate $d$. The drop-stamp (illustrated in Figs. 14 and 15) can thus be readily made to give automatically a single blow or any desired number of blows in rapid succession and of equal intensity, while the length of stroke, and so the intensity of the blow, can be readily adjusted while the stamp is working, while there is no harsh or sudden knocking of tappets or the like, such as are used in many stamps hitherto constructed and necessitate constant repairs, and also the said stamp can be immediately changed from an automatically-controlled stamp to a stamp controlled by hand or foot by the levers 29 30 being raised to their highest position.

When the stamp is to be worked automatically, the cord $z$ is put out of action, as by the pulley 40 being set free upon the rod 42, and when the treadle 43 is to be used to control the cord $z$ the dogs 49 50 are put out of action, as by the rod 56 being slid along to near the pivot of the treadle 43

It is obvious that provided the friction-driving mechanism by which the pull upon the object to be moved is exerted in an apparatus according to this invention be brought into action in the manner hereinbefore described, the nature of that friction-driving mechanism and the precise nature and details of the mechanism provided to bring it into and out of action may be varied in any manner considered suitable in different cases.

The pulling apparatus provided according to this invention is, as will be readily seen from the preceding description, simple, efficient, and easily and conveniently controlled and is applicable for any purpose for which the alternate pulling in any direction and release or the pulling in any direction and holding for any desired time and eventual release of an object is requisite, drop-stamps and horizontally-swinging rams being very important applications of such apparatus.

What I do claim as my invention, and desire to secure by Letters Patent, is—

1. In a pulling mechanism of the kind described, the combination with a friction-clutch in two parts one of which is engageable with and disengageable from the other normally revolving part, and a clutch-engaging device connected to the engageable and disengageable part to turn therewith, of an operating device in operative connection with such clutch-engaging device and in rolling connection with a part mounted about the axis of the clutch, substantially as herein described.

2. In a pulling mechanism of the kind described, the combination with a friction-clutch in two parts one of which is engageable with and disengageable from the other normally revolving part and a clutch-engaging device connected to the engageable and disengageable part to turn therewith, of an operative device in operative connection with such clutch-engaging device and in rolling connection with a part mounted to oscillate about the axis of the clutch, and means to transmit operative force to such part mounted about the axis of the clutch and in connection therewith so as to roll on and off in operating it, substantially as herein described.

3. In a pulling mechanism, of the kind described, the combination with a friction-clutch in two parts one of which is engageable with and disengageable from the other normally revolving part, a clutch-engaging device connected to the engageable and disengageable part to turn therewith, of an operating device in operative connection with such clutch-engaging device and in rolling connection with a part mounted about the axis of the clutch, a secondary friction-clutch in two parts one of which is engageable with and disengageable from the other normally revolving part and is connected to the said operating device, and means to engage and disengage the parts of the said secondary clutch, substantially as herein described.

4. In a pulling mechanism of the kind described, the combination with a friction-clutch in two parts one of which is engageable with and disengageable from the other normally revolving part and a clutch-engaging device connected to the engageable and disengageable part to turn therewith, of an operating device in operative connection with such clutch-engaging device and in rolling connection with a part mounted to oscillate about the axis of the clutch, means to transmit operative force to such part mounted about the axis of the clutch and in connection therewith so as to roll on and off in operating it, a secondary friction-clutch in two parts one of which is engageable with and disengageable from the other normally revolving part connected to the said operating device, and means to engage and disengage the parts of the said secondary clutch, substantially as hereinbefore described.

5. In a pulling mechanism of the kind hereinbefore described, the combination with a friction-clutch in two parts one of which is engageable with and disengageable from the other normally revolving part and a clutch-engaging device carried by the engageable part and disengageable part to turn therewith, of an operating device in operative connection with such clutch-engaging device and in rolling connection with a part mounted about the axis of the clutch, a secondary friction-clutch in two parts, one of which is engageable with and disengageable from the other normally revolving part connected to the said operating device, and means to engage and disengage the parts of the said secondary clutch, substantially as hereinbefore described.

6. In a pulling mechanism of the kind described, the combination with a friction-clutch in two parts one of which is engageable with and disengageable from the other normally revolving part, a clutch-engaging device carried by the engageable and disengageable part to turn therewith in the engagement thereof, of an operating device in operative connection with such clutch-engaging device and in rolling connection with a part mounted to oscillate about the axis of the clutch to transmit operative force to such part mounted about the axis of the clutch and in connection therewith so as to roll on and off in operating it, a secondary friction-clutch in two parts one of which is engageable with and disengageable from the other normally revolving part connected to the said operating device, and means to engage and disengage the parts of the said secondary clutch, substantially as hereinbefore described.

7. In a drop-stamp, a pulling and holding device the combination of a shaft normally revolving and a pulley thereon and a band to grip the said pulley, a drum to carry the said band, a connection thereto for the attachment of a body to be pulled and held, a lever carried by the said drum to tighten the said band and a spring to release it, a flexible connection attached to the said lever, a friction device to tighten and release the said flexible connection, flexible connections each attached at one end to the said friction device, levers connected to the other ends of such flexible connections, sectors and catches to secure the said levers in different positions and a handle and treadle connected to the first-named flexible connection to be operated by the attendant to tighten and release it substantially as hereinbefore described.

8. In combination with a principal friction-clutch which is used in a pulling mechanism and is provided with a driving part normally revolving and a driven part which is capable of engagement with and disengagement from the driving part and a mechanical connection to operate it, a supplementary friction-clutch to operate such mechanical connection and comprising two parts, one a driving part normally revolving and a driven part mounted to slide upon a part of the driven part of the principal friction-clutch and a spring to act upon it, a sleeve also mounted to turn upon a part of the driven part of the principal friction-clutch and a strut interposed between a part of the driven part of the supplementary friction-clutch and a part of the said sleeve and movable relatively to the parts on which it bears, flexible connections attached to the said sleeve to coil and uncoil thereon and therefrom and fixed points of attachment for the said flexible connections, substantially as hereinbefore described.

9. In combination with a principal friction-clutch which is used in a pulling mechanism and is provided with a driving part normally revolving and a driven part which is capable of engagement with and disengagement from the driving part and a mechanical connection to operate it, a supplementary friction-clutch to operate such mechanical connection and comprising two parts, one a driving part normally revolving and a driven part mounted to slide upon a part of the driven part of the principal friction-clutch and a spring to act upon it, a sleeve also mounted to turn upon a part of the driven part of the principal friction-clutch and a strut interposed between a part of the driven part of the supplementary friction-clutch and a part of the said sleeve and movable relatively to the parts on which it bears, flexible connections attached to the said sleeve to coil and uncoil thereon and therefrom and adjustable fixed points of attachment for the said flexible connections, substantially as hereinbefore described.

In testimony that I claim the foregoing as my invention I have signed my name, in presence of two witnesses, this 31st day of January, 1903.

HAROLD F. MASSEY.

Witnesses:
 HOWARD CHEATHAM,
 HERBERT J. JONES.